(12) United States Patent
Okano et al.

(10) Patent No.: US 11,340,387 B2
(45) Date of Patent: May 24, 2022

(54) DIFFUSER

(71) Applicant: NALUX CO., LTD., Osaka (JP)

(72) Inventors: Masato Okano, Osaka (JP); Daisuke Seki, Osaka (JP); Kazuya Yamamoto, Osaka (JP); Makio Nishimaki, Osaka (JP)

(73) Assignee: NALUX CO., LTD., Osaka (JP)

( * ) Notice: Subject to any disclaimer, the term of this patent is extended or adjusted under 35 U.S.C. 154(b) by 0 days.

(21) Appl. No.: 16/944,476

(22) Filed: Jul. 31, 2020

(65) Prior Publication Data
US 2020/0363569 A1  Nov. 19, 2020

Related U.S. Application Data

(63) Continuation of application No. PCT/JP2018/007803, filed on Mar. 1, 2018.

(51) Int. Cl.
*G02B 5/02* (2006.01)
(52) U.S. Cl.
CPC ......... *G02B 5/0215* (2013.01); *G02B 5/0252* (2013.01); *G02B 5/0268* (2013.01)
(58) Field of Classification Search
CPC ... G02B 5/0215; G02B 5/0252; G02B 5/0268
See application file for complete search history.

(56) References Cited

U.S. PATENT DOCUMENTS

| 5,771,328 A * | 6/1998 | Wortman | G02B 6/0053 385/146 |
| 6,067,391 A * | 5/2000 | Land | G02B 6/02085 385/27 |
| 9,158,040 B2 * | 10/2015 | Kamiyama | G02B 1/118 |
| 2001/0036015 A1 * | 11/2001 | Eguchi | G02B 5/0278 359/622 |
| 2002/0141065 A1 | 10/2002 | Cowan et al. | |
| 2004/0100699 A1 | 5/2004 | Cowan et al. | |
| 2004/0130790 A1 | 7/2004 | Sales | |
| 2005/0174646 A1 | 8/2005 | Cowan et al. | |
| 2008/0013180 A1 | 1/2008 | Cowan et al. | |

(Continued)

FOREIGN PATENT DOCUMENTS

| EP | 1 364 233 B1 | 1/2013 |
| JP | 2006-500621 A | 1/2006 |

(Continued)

OTHER PUBLICATIONS

International Search Report and Written Opinion dated May 29, 2018 corresponding to International Patent Application No. PCT/JP2018/007803, and partial English translation thereof.

*Primary Examiner* — Robert E. Tallman
(74) *Attorney, Agent, or Firm* — Squire Patton Boggs (US) LLP

(57) ABSTRACT

A diffusion element is configured by combining: a structure for diffusion constituted by combining periodic surface structures having multiple periods to achieve a light intensity distribution in which the light intensity is uniform at angles less than or equal to a predetermined diffusion angle θ and the light intensity is as close as possible to zero intensity at angles greater than the diffusion angle θ; and a diffractive structure having a period of 1 or more and 2 or less times of Λmax, where Λmax is the maximum period of the structure for diffusion.

14 Claims, 7 Drawing Sheets

(56) References Cited

U.S. PATENT DOCUMENTS

2017/0131559 A1    5/2017  Sitter et al.
2018/0024280 A1*  1/2018  Yamamoto .............. B29C 33/42
                                                  362/311.01

FOREIGN PATENT DOCUMENTS

| | | |
|---|---|---|
| JP | 2011-034072 A | 2/2011 |
| JP | 2015-194541 A | 11/2015 |
| JP | 2017-522589 A | 8/2017 |
| WO | WO 02/10803 A2 | 2/2002 |
| WO | WO 2004/027495 A2 | 4/2004 |
| WO | WO 2015/191339 A1 | 12/2015 |
| WO | WO 2016/163275 A1 | 10/2016 |

\* cited by examiner

DIFFUSER

CROSS REFERENCE TO RELATED APPLICATION

This is a Continuation of International Patent Application No. PCT/JP2018/007803 filed Mar. 1, 2018, which designates the U.S. The contents of this application is hereby incorporated by reference.

TECHNICAL FIELD

The present invention relates to a diffuser.

BACKGROUND ART

Diffusers using a microlens array (Patent 1, JP2006500621A) and hologram technology (Patent 2, JP2015194541A) have been developed.

In general, it is desirable that intensity of light diffused by a diffuser is uniform. In order to make intensity of light diffused by a diffuser using diffraction such as hologram technology uniform, it is necessary to make the maximum period of periodic surface structures that cause diffraction great so that light spots generated by the diffraction are densely distributed on an illuminated surface. The maximum value of period of the periodic surface structures, however, is restricted by the size of the diffuser. Accordingly, a diffuser using diffraction that is small enough for practical use and that provides a uniform distribution of intensity of the diffused light has not been developed till now.

PRIOR ART DOCUMENT

Patent Document

Patent document 1: JP2006500621A
Patent document 1: JP2015194541A

Accordingly, there is a need for a diffuser using diffraction that is small enough for practical use and that provides a uniform distribution of intensity of diffused light. The object of an embodiment of the present invention is to provide a diffuser using diffraction that is small enough for practical use and that provides a uniform distribution of intensity of diffused light.

SUMMARY OF THE INVENTION

A diffuser according to a first aspect of the present invention is configured by combining a structure for diffusion in which periodic surface structures having multiple periods are combined so as to make a distribution of intensity of light approximate to a distribution that is uniform at angles equal to or less than a predetermined angle of diffusion $\theta$ and 0 at angles greater than the predetermined angle of diffusion $\theta$, and a diffraction structure having a period that is equal to or greater than $\Lambda_{max}$ and equal to or less than $2\Lambda_{max}$ where $\Lambda_{max}$ represents the maximum period of the periodic surface structures, wherein the periodic surface structures and the diffraction structure are in a certain direction.

The diffuser according to the present aspect is configured by a combination of a structure for diffusion in which periodic surface structures having multiple periods and a diffraction structure having a period that is equal to or greater than the maximum period of the periodic surface structures and equal to or less than double the maximum period. Accordingly, the diffuser that is small enough for practical use and is capable of providing a uniform distribution of intensity of diffused light can be obtained.

In the diffuser according to a first embodiment of the first aspect of the present invention, z-coordinate of the surface of the diffuser is represented by $$z = \sum_{i=1}^{N} \frac{a_i}{2} \cdot f_{\Lambda i}(x) + \frac{h}{2} \cdot f_{\Lambda doe}(x),$$

where an x-axis is defined in the certain direction on a reference plane, a z-axis is defined in the direction perpendicular to the reference plane, a z-axis is defined in the direction perpendicular to the reference plane, each of the periodic surface structures is represented by i, an i-th periodic surface structure is represented by $$f_{\Lambda i}(x),$$

the diffraction structure is represented by $$f_{\Lambda doe}(x),$$

the total number of the periodic surface structures is represented by N, the height of the i-th periodic surface structure is represented by $a_i$, and the height of the diffraction structure is represented by h.

In the diffuser according to a second embodiment of the first aspect of the present invention, the relationship $$\Lambda_d \leq \Lambda_{max} \leq \frac{\lambda}{5n \cdot \sin(2\Delta\theta)}$$

is satisfied for $\Delta\theta$ and $\Lambda_{doe}$ that are determined by $$n \cdot \sin(\Delta\theta) = \frac{\lambda}{\Omega}$$

$$n \cdot \sin\left(\frac{\theta}{2}\right) = \frac{\lambda}{\Lambda_d},$$

where the wavelength of light is represented by $\lambda$, the refractive index of a medium through which transmitted light passes is represented by n, and the size of the diffuser is represented by $\Omega$.

In the diffuser according to a third embodiment of the first aspect of the present invention, the relationship $$\tfrac{1}{10}\lambda \leq a \leq 10\lambda$$

is satisfied, where the wavelength of light is represented by $\lambda$ and the height of a periodic surface structure of the structure for diffusion is represented by a.

In the diffuser according to a fourth embodiment of the first aspect of the present invention, the relationship $$\frac{\lambda}{5(n_s - 1)} \leq h \leq \frac{\lambda}{n_s - 1}$$

is satisfied, where the wavelength of light is represented by $\lambda$, the height of the diffraction structure is represented by h and the refractive index of the material of the diffraction structure is represented by $n_s$.

In the diffuser according to a fifth embodiment of the first aspect of the present invention, the relationship $$\frac{a_{max}}{\Lambda_{min}} < 1$$

is satisfied, where the maximum value of height of the periodic surface structures is represented by $a_{max}$ and the minimum value of period of the periodic surface structures is represented by $\Lambda_{min}$.

The diffuser according to the present embodiment is suitable for mass production because the above-described relationship is satisfied.

In the diffuser according to a sixth embodiment of the first aspect of the present invention, the structure for diffusion and the diffraction structure are two-dimensional and z coordinate of the surface of the diffuser is represented by $$z = f_1(x) \cdot f_2(y)$$

where an x-axis and y-axis are defined in two directions orthogonal to each other on a reference plane, a z-axis is defined in the direction perpendicular to the reference plane, z coordinate of the surface of the diffuser in the x-axis direction is represented by $$z = f_1(x),$$

and z coordinate of the surface of the diffuser in the y-axis direction is represented by $$z = f_2(y).$$

In the diffuser according to a seventh embodiment of the first aspect of the present invention, the structure for diffusion and the diffraction structure are of annular shape, and z coordinate of the surface of the diffuser is represented by $$z = f_3(r)$$

where r represents coordinate in the radial direction of the annular shape on a reference plane, and a z-axis is defined in the direction perpendicular to the reference plane.

A method for producing a diffuser according to a second aspect of the present invention includes the steps of: forming a structure for diffusion in which periodic surface structures having multiple periods are combined so as to make a distribution of intensity of light approximate to a distribution that is uniform at angles equal to or less than a predetermined angle of diffusion θ and 0 at angles greater than the predetermined angle of diffusion θ; and combining the structure for diffusion with a diffraction structure having a period that is equal to or greater than $\Lambda_{max}$ and equal to or less than $2\Lambda_{max}$ where $\Lambda_{max}$ represents the maximum period of the periodic surface structures, wherein the periodic surface structures and the diffraction structure are in a certain direction.

In the method for producing a diffuser according to the present aspect, the diffuser is configured by a combination of a structure for diffusion in which periodic surface structures having multiple periods and a diffraction structure having a period that is equal to or greater than the maximum period of the periodic surface structures and equal to or less than double the maximum period. Accordingly, the diffuser that is small enough for practical use and is capable of providing a uniform distribution of intensity of diffused light can be produced.

In the method according to a first embodiment of the second aspect of the present invention, z-coordinate of the surface of the diffuser is represented by $$z = \sum_{i=1}^{N} \frac{a_i}{2} \cdot f_{\Lambda i}(x) + \frac{h}{2} \cdot f_{\Lambda doe}(x),$$

where an x-axis is defined in the certain direction, a z-axis is defined in the direction perpendicular to the reference plane, a z-axis is defined in the direction perpendicular to the reference plane, each of the periodic surface structures is represented by i, an i-th periodic surface structure is represented by $$f_{\Lambda i}(x),$$

the diffraction structure is represented by $$f_{\Lambda doe}(x),$$

the total number of the periodic surface structures is represented by N, the height of the i-th periodic surface structure is represented by $a_i$, and the height of the diffraction structure is represented by h.

In the method according to a second embodiment of the second aspect of the present invention, the relationship $$\Lambda_d \leq \Lambda_{max} \leq \frac{\lambda}{5n \cdot \sin(2\Delta\theta)}$$

is satisfied for $\Delta\theta$ and $\Lambda_d$ that are determined by $$n \cdot \sin(\Delta\theta) = \frac{\lambda}{\Omega}$$

$$n \cdot \sin\left(\frac{\theta}{2}\right) = \frac{\lambda}{\Lambda_d},$$

where the wavelength of light is represented by λ, the refractive index of a medium through which transmitted light passes is represented by n, and the size of the diffuser is represented by Ω.

In the method according to a third embodiment of the second aspect of the present invention, the relationship $$1/10 \leq a \leq 10\lambda$$

is satisfied, where the wavelength of light is represented by λ and the height of a periodic surface structure of the structure for diffusion is represented by a.

In the method according to a fourth embodiment of the second aspect of the present invention, the relationship $$\frac{\lambda}{5(n_s - 1)} \leq h \leq \frac{\lambda}{n_s - 1}$$

is satisfied where the wavelength of light is represented by λ, the height of the diffraction structure is represented by h and the refractive index of the material of the diffraction structure is represented by $n_s$.

In the method according to a fifth embodiment of the second aspect of the present invention, the relationship $$\frac{a_{max}}{\Lambda_{min}} < 1$$

is satisfied, where the maximum value of height of the periodic surface structures is represented by $a_{max}$ and the minimum value of period of the periodic surface structures is represented by $\Lambda_{min}$.

The method according to the present embodiment can be easily carried out because the above-described relationship is satisfied.

DESCRIPTION OF EMBODIMENTS

Figure 1:
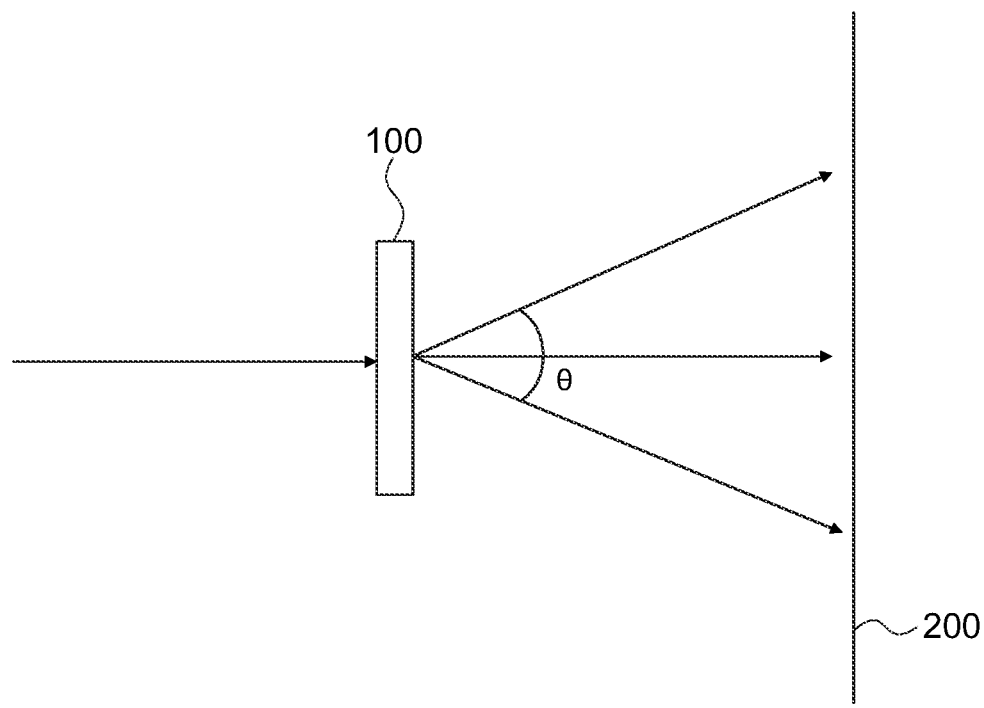
FIG. 1 illustrates diffusion caused by periodic surface structures.

FIG. 1 illustrates diffraction caused by a periodic surface structure. When the height of a periodic surface structure is ten times as great as the wavelength of the light concerned or smaller, behaviors of the transmitted light are determined by diffraction rather than by refraction. Thus, diffraction is generated by the periodic surface structure. A ray of light normally incident onto the entry side surface provided with a surface periodic surface structure of an element 100 is diffracted by the surface periodic surface structure, and diffracted rays of light in predetermined directions are generated. The diffracted rays of light of $\pm 1^{st}$ order will be studied below. When the angle formed by the diffracted rays of light of $\pm 1^{st}$ order is represented by θ, the wavelength of the ray of incident light is represented by λ, the period of the surface periodic surface structure is represented by Λ, and the refractive index of the medium through which the transmitted rays pass is represented by n, the following approximation holds.

$$n \cdot \sin\left(\frac{\theta}{2}\right) = \frac{\lambda}{\Lambda} \quad (1)$$

θ/2 is defined as angle of diffraction. For example, in order to obtain θ=30 degrees for a ray with λ=650 nanometers, a periodic surface structure with Λ=2.5 micrometers is required. Since the angle θ can be changed by changing the period Λ, a diffuser which generates a beam width of which is ±θ/2 for a ray of light normally incident onto the entry side surface can be obtained by a combination of periodic surface structures having different periods. In this case, the angle θ is referred to as angle of diffusion.

On the other hand, the period of a periodic surface structure cannot be made greater than the size Ω of the element. In this case, the size of the element means the length of the combination of periodic surface structures. By substituting Ω for Λ in expression (1), the following expression can be obtained.

$$n \cdot \sin(\Delta\theta) = \frac{\lambda}{\Omega} \quad (2)$$

In Expression (2), Δθ corresponds to an interval between spots generated on an illuminated surface 200 by the diffracted rays of light. In other words, Δθ corresponds to the uniformity of intensity of light on the illuminated surface. The smaller Δθ, the more uniform the intensity of light on the illuminated surface 200 is. Thus, it is necessary to increase the size Ω of the element and thus to reduce Δθ in order to make the intensity of light on the illuminated surface 200 more uniform.

Figure 2:
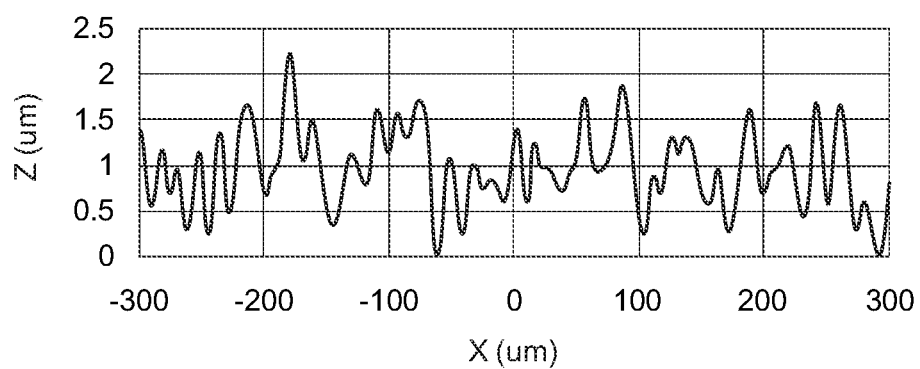
FIG. 2 shows a cross section of a conventional diffuser, the cross section being perpendicular to a reference plane.

FIG. 2 shows a cross section of a conventional diffuser, the cross section being perpendicular to a reference plane. The diffuser shown in FIG. 2 is a combination of plural periodic surface structures having plural periods. The horizontal axis of FIG. 2 indicates an x axis on the reference plane and in the direction of the combination of periodic surface structures, and the vertical axis of FIG. 2 indicates a z axis perpendicular to the reference plane. The unit of the horizontal axis and the vertical axis is micrometer.

Figure 3:
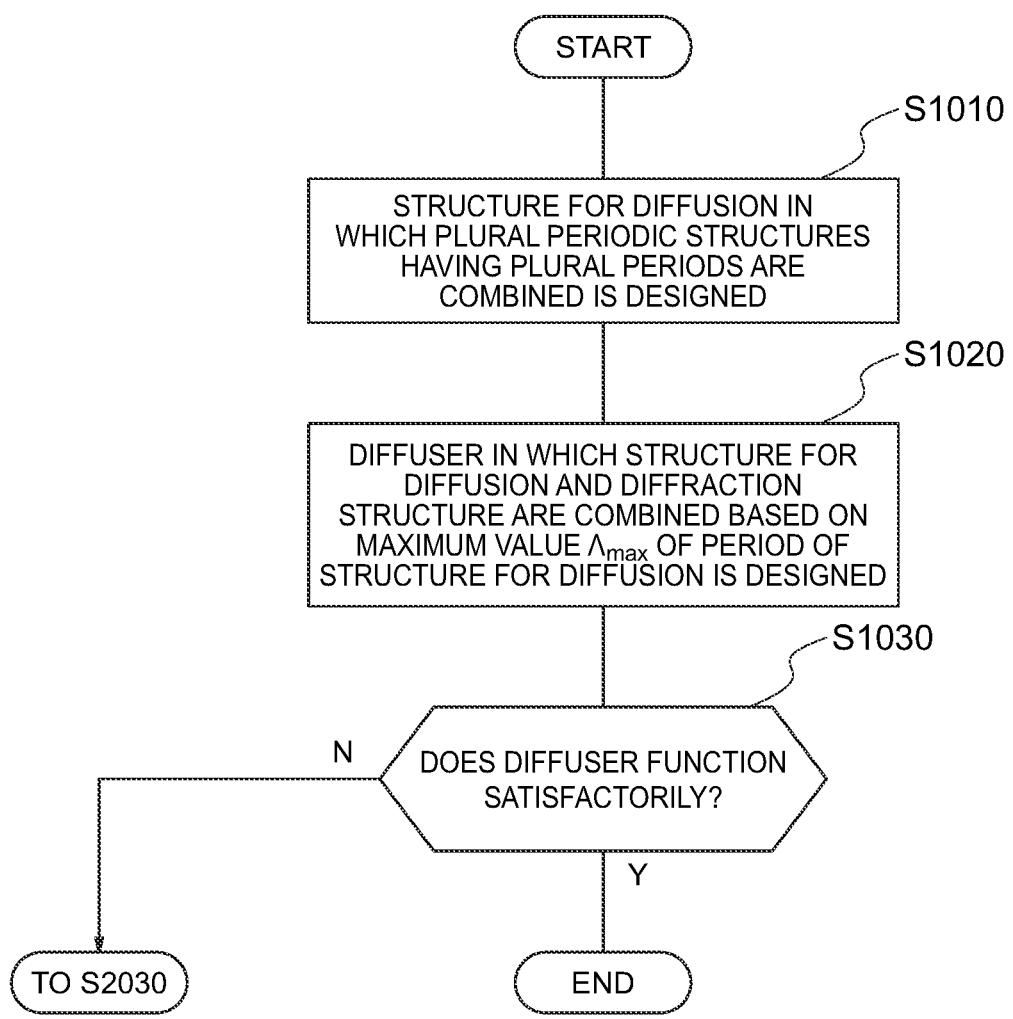
FIG. 3 is a flowchart for showing how to design a diffuser according to an embodiment of the present invention.

FIG. 3 is a flowchart for showing how to design a diffuser according to an embodiment of the present invention. It is assumed that the size Ω of the diffuser is 500 micrometers, the refraction index $n_s$ of a material of the diffuser is 1.5, and the wavelength of light is 0.65 micrometers.

In step S1010 of FIG. 3, a structure for diffusion in which plural periodic surface structures having plural periods are combined is designed. In the present embodiment, the cross-sectional shape of any periodic surface structures is sinusoidal. Alternatively, the cross-sectional shape of any periodic surface structures can be trapezoidal.

Figure 4:
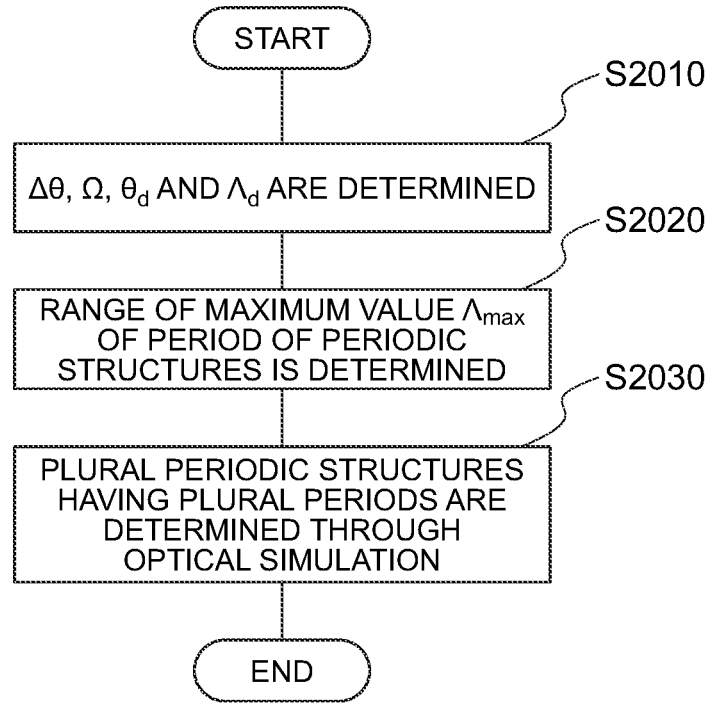
FIG. 4 is a flowchart for illustrating step S1010 of FIG. 3.

FIG. 4 is a flowchart for illustrating step S1010 of FIG. 3.

In step S2010 of FIG. 4, an angle Δθ corresponding to the uniformity of intensity of light on the illuminated surface, a size Ω of the element, a target angle of diffusion $\theta_d$ and a period $\Lambda_d$ corresponding to the target angle of diffusion $\theta_d$ are determined. The angle Δθ and the size Ω of the element are determined based on Expression (2). The target angle of diffusion $\theta_d$ and the period $\Lambda_d$ corresponding to the target angle of diffusion $\theta_d$ will be described below.

A target diffuser is one that has an angle of diffusion $\theta_d$ and diffuses incident light that is normally incident onto the entry side surface such that intensity of the diffused light is uniform at angles within a range of $\pm\theta_d/2$ and the diffused light is absent outside the range of $\pm\theta_d/2$. The above-described intensity of the diffused light is referred to as a target intensity of light. The period $\Lambda_d$ corresponding to the target angle of diffusion $\theta_d$ is obtained by substituting $\theta=\theta_d$ into Expression (1).

$$\Lambda_d = \frac{\lambda}{n \cdot \sin\left(\frac{\theta_d}{2}\right)} \quad (3)$$

In step S2020 of FIG. 4, a range of the maximum value $\Lambda_{max}$ of periods of the plural periodic surface structures is determined.

When the target intensity of light is realized by a combination of plural periodic surface structures having plural periods, the maximum value $\Lambda_{max}$ has to be made equal to or greater than $\Lambda_d$. By taking account of Expression (2) and experience, the maximum value $\Lambda_{max}$ of period of the plural periods should be determined within the following range.

$$\Lambda_d \leq \Lambda_{max} \leq \frac{\lambda}{10n \cdot \sin(\Delta\theta)} \quad (4)$$

In step S2030 of FIG. 4, the plural periodic surface structures having plural periods are determined through optical simulation.

When an x-axis is defined on a reference plane of the structure for diffusion and in the direction of the periodic surface structures, and a z-axis is defined in the direction perpendicular to the reference plane, z coordinate of the surface of the combination of periodic surface structures having plural periods is represented by the following expression. The reference plane means a plane that is perpendicular to the direction of light that is incident onto the element and is to be diffused by the element under standard conditions.

$$z = \sum_{i=1}^{N} \frac{a_i}{2} \cdot \sin\left(\frac{2\pi}{\Lambda_i} x\right)$$

In the above-described expression, i represents a natural number assigned to a periodic surface structure, and N represents the total number of the periodic surface structures. $a_i$ represents the height of the i-th periodic surface structure, and $\Lambda_i$ represents the period of the i-th periodic surface structure.

In general, when a periodic surface structure having a period of $\Lambda_i$ is represented by $f_{\Lambda i}(x)$, z coordinate of the surface of the combination of periodic surface structures having plural periods can be represented by the following expression.

$$z = \sum_{i=1}^{N} \frac{a_i}{2} \cdot f_{\Lambda i}(x)$$

Thus, "to combine" plural structures such as periodic surface structures means to form a new structure in which a coordinate of the surface in the direction perpendicular to the reference plane is a sum of the z coordinates of the surfaces of the plural structures to be combined.

Performance of the structure for diffusion thus obtained by the combination of the plural periodic surface structures was evaluated by optical simulation. In the optical simulation, Fraunhofer diffraction equations were used. When a distance to the illuminated surface is relatively small, Fresnel diffraction equations or Rayleigh-Sommerfeld diffraction equations may be used.

In the optical simulation, intensity of light on an illuminated surface is represented by the square of the absolute value of complex-amplitude. Theoretically, a phase distribution (angle of complex-amplitude vector in a complex plane) that determines values of period and height of periodic surface structures can be obtained through the magnitude of the complex-amplitude. In a practical design method, based on a target intensity of light on the illuminated surface, the intensity being a real number, phase distribution should be calculated through complex-amplitude that is a complex number to finally obtain a combination of periodic surface structures. However, in this design method, the real part and the imaginary part of complex-amplitude, the parts being two variables, cannot be obtained by calculation from the real number (the intensity of light on the illuminated surface) that is a single variable. Accordingly, optical simulations are repeated with randomly selected values of period and height of the periodic surface structures, and calculated values of intensity of light on the illuminated surface are evaluated with reference to a target distribution of intensity of light to determine a combination of periodic surface structures as a solution.

The direction of the one-dimensional periodic surface structures is defined as an x-axis on an illuminated surface. A target distribution of intensity of light is represented by Id(x), the maximum value of the intensity is represented by Id_max, a distribution of intensity of light generated by the structure for diffusion distribution on the illuminated surface is represented by I(x) and the maximum value of the intensity is represented by I_max. The following evaluation function u can be used to evaluate the values of intensity of light on the illuminated surface, the values having been calculated by the optical simulations.

$$u = \sum_{x} \left(\frac{I(x)}{I\_max} - \frac{Id}{Id\_max}\right)^2$$

The upper limit $\Lambda_{ul}$ of periods of the periodic surface structures is set to any value that satisfies Expression (4). The optical simulations are repeated while values of period $\Lambda$ and height a of each periodic surface structure are randomly changed under the conditions that the following relationships (5) to (7) are satisfied, and an optimization is carried out using the evaluation function u to determine a combination of periodic surface structures. As an optimization method, simulated annealing was used.

$$\frac{\lambda}{10} \leq a_i \leq 10\lambda \quad (5)$$

$$\frac{a_i}{\Lambda_i} < 1 \quad (6)$$

$$\frac{a_{max}}{\Lambda_{min}} < 1 \quad (7)$$

In the expressions described above, $a_{max}$ represents the maximum value of height of the plural periodic surface structures, and $\Lambda_{min}$ represents the minimum value of period of the plural periodic surface structures.

Figure 6:
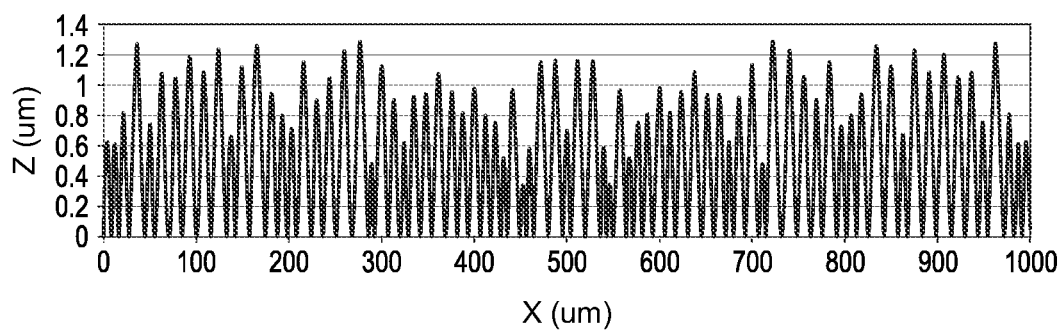
FIG. 6 shows a cross section perpendicular to the reference plane of the structure for diffusion which is determined in step S2030 of FIG. 4 and in which plural periodic surface structures are combined.

FIG. 6 shows a cross section perpendicular to the reference plane of the structure for diffusion which is determined in step S2030 of FIG. 4 and in which plural periodic surface structures are combined. The horizontal axis of FIG. 6 indicates the x-axis on the reference plane and in the direction of the periodic surface structures, and the vertical axis of FIG. 6 indicates the z-axis perpendicular to the reference plane. The unit of the horizontal axis and the vertical axis is micrometer.

Table 1 shows the maximum value $\Lambda_{max}$ and the minimum value $\Lambda_{min}$ of period of the structure for diffusion and the maximum value $a_{max}$ and the minimum value $a_{min}$ of height of the structure for diffusion. The unit of the numerical values is micrometer.

TABLE 1

|  | Maximum value | Minimum value |
| --- | --- | --- |
| Period (um) | 17.8 | 2.95 |
| Height (um) | 1.3 | 0.215 |

The minimum value $a_{min}$ of height is 0.215 micrometers, the maximum value $a_{max}$ of height is 1.3 micrometers, and λ=0.65 micrometers. Accordingly, Expression (5) is satisfied.

Further, the maximum value $a_{max}$ of height is 1.3 micrometers, and the minimum value $\Lambda_{min}$ of period is 2.95 micrometers. Accordingly, Expressions (6) and (7) are satisfied.

Figure 7:
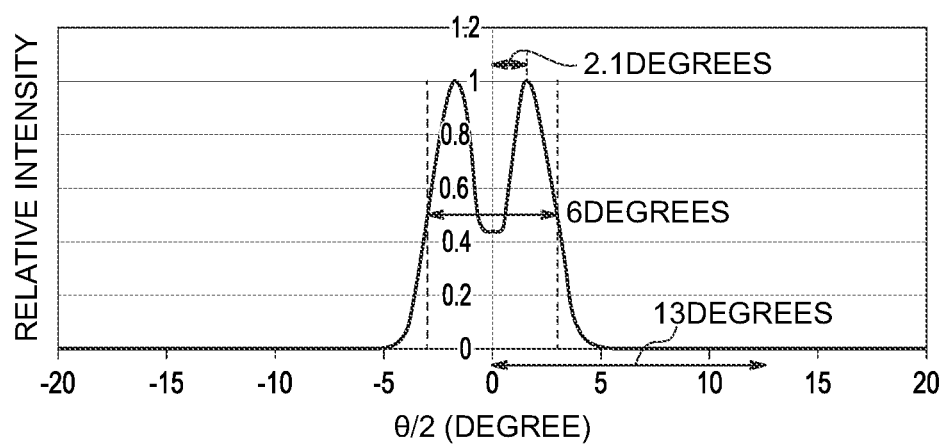
FIG. 7 shows a distribution of intensity of light diffused by the structure for diffusion shown in FIG. 6 on an illuminated surface perpendicular to the incident light.

FIG. 7 shows a distribution of intensity of light diffused by the structure for diffusion shown in FIG. 6 on an illuminated surface perpendicular to the incident light. The horizontal axis of FIG. 7 indicates half value θ/2 of angle of diffusion, and the vertical axis of FIG. 7 indicates relative intensity. The unit of the horizontal axis is degree. In FIG. 7, the angle of diffusion that corresponds to the half value of the maximum value of relative intensity corresponds to the target angle $\theta_d$ of diffusion of the diffuser. $\theta_d$ is 6 degrees. By substituting $\theta_d$=6 (degrees), λ=0.65 (micrometers) and n=1 into Expression (3), $\Lambda_d$=12.4 (micrometers) is obtained. In FIG. 7 the target distribution of intensity of light is represented by broken lines.

By substituting λ=0.65 (micrometers), Ω=500 (micrometers) that is the size of the diffuser and n=1 into Expression (2), the following equation is obtained.

$$\sin(\Delta\theta) = \frac{\lambda}{\Omega} = 0.0013$$

Accordingly, the upper limit of Expression (4) is as below.

$$\frac{\lambda}{10n \cdot \sin(\Delta\theta)} = 50(\mu m)$$

Thus, Expression (4) is satisfied for the maximum value $\Lambda_{max}$ of period, 17.8 micrometers.

According to Expression (3), the half value θ/2 of angle of diffusion that corresponds to the maximum value $\Lambda_{max}$ of period, 17.8 micrometers is 2.1 degrees, and the half value θ/2 of angle of diffusion that corresponds to the minimum value $\Lambda_{min}$ of period, 2.95 micrometers is 13 degrees. In FIG. 7, θ/2=±2.1 (degrees) correspond to the positions of the two peaks of the relative intensity, and θ/2=±13 (degrees) correspond to the positions where the relative intensity substantially reaches zero after having gradually decreased.

As shown in FIG. 7, there exists a valley the bottom of which is located at θ/2=±0 (degree) between the two peaks at θ/2=±2.1 (degrees), and the valley is an obstacle to uniformity of the distribution of intensity of light. The reason why a valley exits at θ/2=±0 (degree) is that the structure for diffusion is formed by a combination of periodic surface structures having plural periods and the maximum value $\Lambda_{max}$ of period of the periodic surface structures cannot be made great enough.

In step S1020 of FIG. 3, a diffuser in which the structure for diffusion and a diffraction structure are combined is designed based on the maximum value $\Lambda_{max}$ of period of the structure for diffusion.

Figure 5:
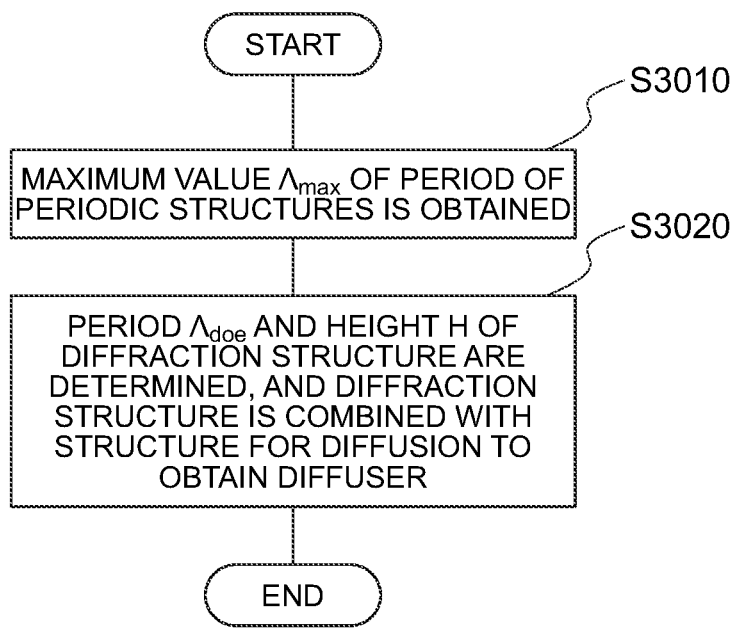
FIG. 5 is a flowchart for illustrating step S1020 of FIG. 3.

FIG. 5 is a flowchart for illustrating step S1020 of FIG. 3.

In step S3010 of FIG. 5, the maximum value $\Lambda_{max}$ of period of the structure for diffusion is obtained. As described above, the maximum value $\Lambda_{max}$ of period of the structure for diffusion is 17.8 micrometers.

In step S3020 of FIG. 5, a value of period $\Lambda_{doe}$ and a value of height h of the diffraction structure are determined, and the diffraction structure is combined with the structure for diffusion to obtain the diffuser.

In FIG. 7, the half value of angle of diffusion corresponding to the peak of relative intensity of light is represented by Φ (=2.1 degrees). When the period $\Lambda_{doe}$ of the diffraction structure is determined as below, the valley between the two peaks is filled so that the intensity of light can be made more uniform.

$$\Lambda_{doe} = \frac{\lambda}{\sin\left(\frac{\phi}{2}\right)}$$

Figure 8:
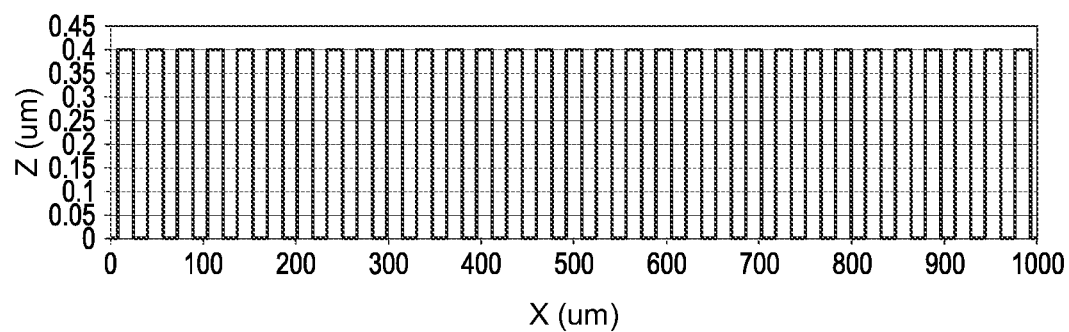
FIG. 8 shows a cross section perpendicular to the reference plane of the diffraction structure.

FIG. 8 shows a cross section perpendicular to a reference plane of the diffraction structure. The horizontal axis of FIG. 8 indicates the x-axis on the reference plane and in the direction of the diffraction structure, and the vertical axis of FIG. 8 indicates the z-axis perpendicular to the reference plane. The unit of the horizontal axis and the vertical axis is micrometer. The diffraction structure is a rectangular grating, the period of which is 32.2 micrometers and the height of which is 0.4 micrometers. The above-described period corresponds to the diffraction angle of 1.16 degrees.

When an x-axis is determined on the reference plane and in the direction of the diffraction structure, and a z-axis is determined in the direction perpendicular to the reference plane, z coordinate of the surface of the diffraction structure is represented by the following expression.

$$z = \frac{h}{2} \cdot \text{sgn}\left[\sin\left(\frac{2\pi}{\Lambda_{doe}} \cdot x\right)\right]$$

In the expression described above, h represents height of the diffraction structure, and $\Lambda_{doe}$ represents period of the diffraction structure. Further, sgn[ ]

represents a function a value of which is 1 when a value of the term in the bracket [ ] is positive and −1 when a value of the term in the bracket [ ] is negative.

Figure 9:
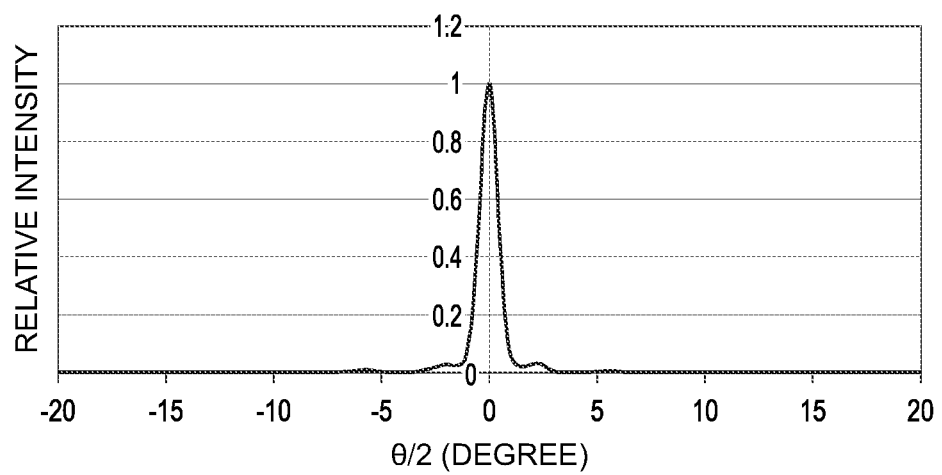
FIG. 9 shows a distribution of intensity of light diffused by the diffraction structure shown in FIG. 8 on an illuminated surface perpendicular to the incident light.

FIG. 9 shows a distribution of intensity of light diffused by the diffraction structure shown in FIG. 8 on an illuminated surface perpendicular to the incident light. The horizontal axis of FIG. 9 indicates half value θ/2 of angle of diffraction, and the vertical axis of FIG. 9 indicates relative intensity. The unit of the horizontal axis is degree.

It is expected that by a combination of the structure for diffusion shown in FIG. 6 and the diffraction structure shown in FIG. 8, a superposition of the distribution of intensity of light shown in FIG. 7 and the distribution of intensity of light shown in FIG. 9 is realized so that a uniform distribution of intensity of light can be obtained.

Figure 10:
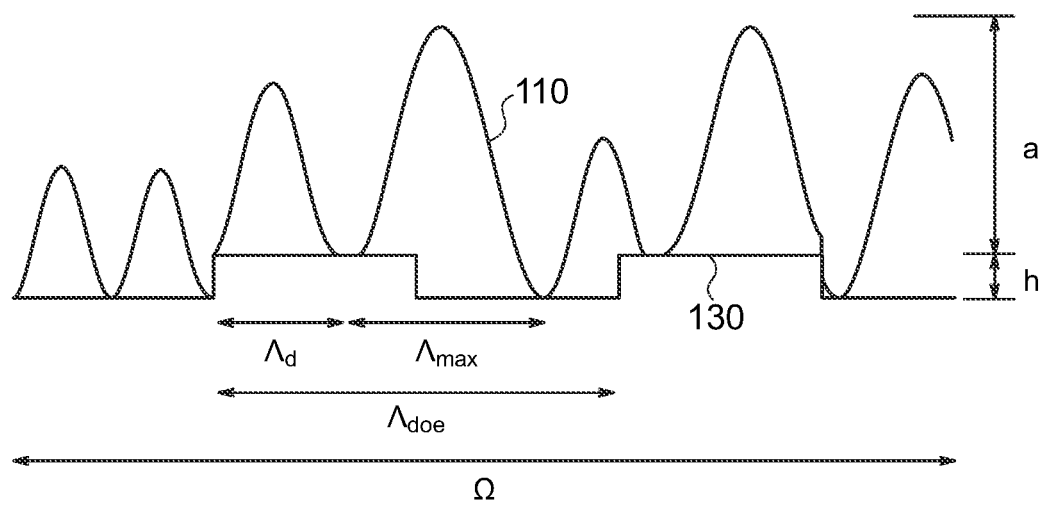
FIG. 10 is a conceptual diagram for illustrating a combination of a structure for diffusion formed by periodic surface structures having plural periods and a diffraction structure.

FIG. 10 is a conceptual diagram for illustrating a combination of a structure for diffusion 110 formed by periodic surface structures having plural periods and a diffraction structure 130. In FIG. 10, height of the structure for diffusion 110 is represented by a, and height of the diffraction structure 130 is represented by h.

When on the reference plane of a diffuser in which a structure for diffusion and a diffraction structure are combined, an x-axis is defined in the direction of the structure for diffusion and the diffraction structure, and a z-axis is defined in the direction perpendicular to the reference plane, z coordinate of the surface of the diffuser is expressed by the following expression.

$$z = \sum_{i=1}^{N} \frac{a_i}{2} \cdot \sin\left(\frac{2\pi}{\Lambda_i}x\right) + \frac{h}{2} \cdot \text{sgn}\left[\sin\left(\frac{2\pi}{\Lambda_{doe}} \cdot x\right)\right]$$

In general, when a periodic surface structure of a period $\Lambda_i$ is represented by $$f_{\Lambda_i}(x),$$

and a diffraction structure is represented by $$f_{\Lambda doe}(x),$$

z coordinate of the surface of a diffuser in which a structure for diffusion and the diffraction structure are combined is represented by the following expression.

$$z = \sum_{i=1}^{N} \frac{a_i}{2} \cdot f_{\Lambda_i}(x) + \frac{h}{2} \cdot f_{\Lambda doe}(x) \quad (8)$$

How to determine the period $\Lambda_{doe}$ and the height h of the diffraction structure 130 will be described below. An optimization method is used to obtain the period $\Lambda_{doe}$ and the height h that minimizes an evaluation function like u in such a way as described above. In the method, optical simulation is repeated for diffusers in which diffraction structures with various values of period $\Lambda_{doe}$ and height h are combined with the periodic surface structures in the ranges that satisfy the following expressions.

$$\Lambda_{max} \leq \Lambda_{doe} \leq 2\Lambda_{max} \quad (9)$$

$$\frac{\lambda}{5(n_s - 1)} \leq h < \frac{\lambda}{n_s - 1} \quad (10)$$

In the expressions described above, refractive index of the material of the diffraction structure 130 is represented by $n_s$.

Concerning Expression (9), when the period $\Lambda_{doe}$ is smaller than $\Lambda_{max}$, the diffraction angle is greater than the half value Φ of angle of diffusion, the half value corresponding to one of the peaks in FIG. 7, and the valley between the two peaks cannot be filled. When the period $\Lambda_{doe}$ is greater than $2\Lambda_{max}$, the diffraction angle is smaller than Φ/2, and the valley between the two peaks cannot be filled to a sufficient extent.

When Expression (10) is satisfied, the 0-order light and the $1^{st}$ order lights of the diffraction structure are superposed by lights diffused by the structure for diffusion, and unevenness of intensity of light on an illuminated surface can be improved.

Figure 11:
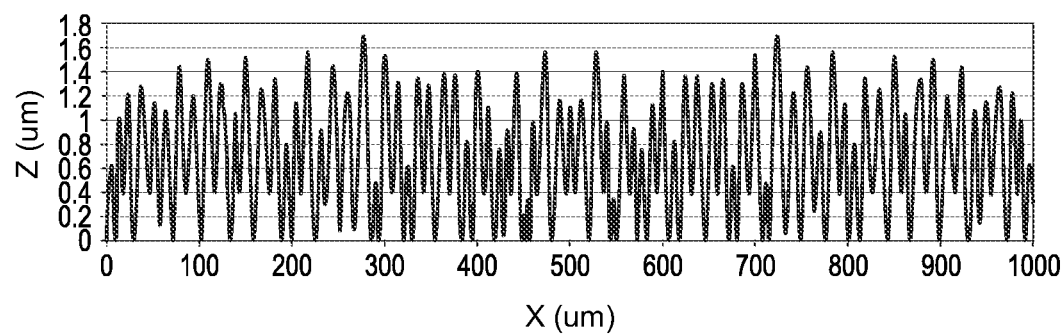
FIG. 11 shows a cross section perpendicular to the reference plane of a diffuser in which a structure for diffusion and a diffraction structure is combined.

FIG. 11 shows a cross section perpendicular to a reference plane of a diffuser in which a structure for diffusion and a diffraction structure is combined. The horizontal axis of FIG. 11 indicates an x-axis on the reference plane and in the direction of the structure for diffusion and the diffraction structure, and the vertical axis of FIG. 11 indicates a z-axis perpendicular to the reference plane. The unit of the horizontal axis and the vertical axis is micrometer.

Figure 12:
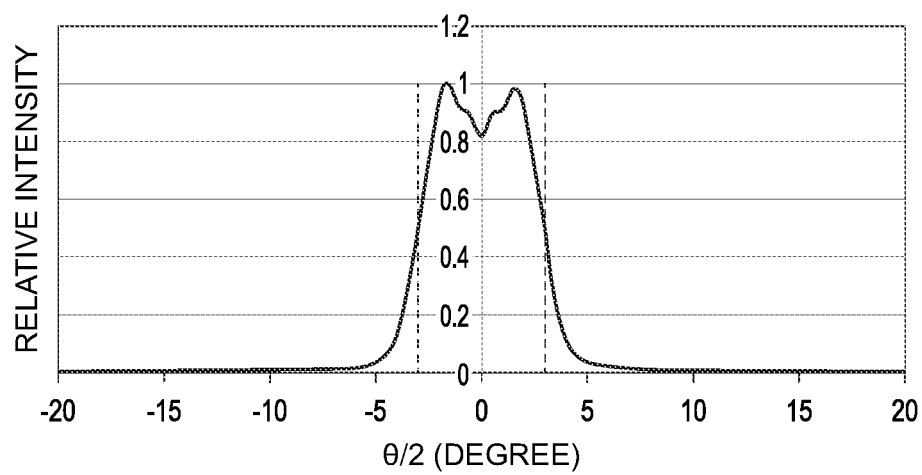
FIG. 12 shows a distribution of intensity of light diffused by the diffuser shown in FIG. 11 on an illuminated surface perpendicular to the incident light.

FIG. 12 shows a distribution of intensity of light diffused by the diffuser shown in FIG. 11 on an illuminated surface perpendicular to the incident light. The horizontal axis of FIG. 12 indicates half value of angle of diffusion, and the vertical axis of FIG. 12 indicates relative intensity of light. The unit of the horizontal axis is degree. In FIG. 12, a target distribution of intensity of light is represented by broken lines. In the distribution of intensity of light shown in FIG. 12 the valley between the two peaks is filled and the distribution is made more uniform than the distribution of intensity of light shown in FIG. 7.

In step S1030 of FIG. 3, it is determined whether or not the diffuser in which the structure for diffusion and the diffraction structure are combined functions as a diffuser satisfactorily, that is, a difference between the distribution of intensity of light generated by the diffuser and the target distribution of intensity of light is sufficiently small.

If the difference is sufficiently small, the process is terminated. If the difference is not sufficiently small, the process returns to step S2030.

In step 2030 of FIG. 4, another value that satisfies Expression (4) is employed as the upper limit $\Lambda_{ul}$ of periods, and the structure for diffusion is determined through the optimization process.

The maximum value $\Lambda_{max}$ of period of the structure for diffusion is 17.8 micrometers, and the period $\Lambda_{doe}$ of the diffraction structure is 32.2 micrometers. Thus, Expression (9) is satisfied.

Further, the height of the diffraction structure is 0.4 micrometers, the refractive index $n_s$ of the material of the diffraction structure is 1.5, and the wavelength λ is 0.65 micrometers. Thus, Expression (10) is satisfied.

The structure for diffusion and the diffraction structure in the above-described embodiment are one-dimensional and in the x-axis direction. Alternatively, a structure for diffusion and a diffraction structure can be two-dimensional, that is, in the x-axis direction and y-axis direction. When a function in the x-axis direction expressed by Expression (8) is represented by $$z = f_1(x),$$

and a function in the y-axis direction defined in a similar way is represented by $$z = f_2(y),$$

z coordinate of the surface of a diffuser in which a two-dimensional structure for diffusion and a two-dimensional diffraction structure are combined can be represented by the following expression.

$$z = f_1(x) \cdot f_2(y)$$

How to manufacture a diffuser will be described below. In a manufacturing process of a diffuser, a mold is produced by the lithography technology in which an irradiation source for X-rays, ultraviolet rays, a proton beam, an electron beam or the like is used. In this case, a substrate is coated with a resist, and the surface of the resist is exposed to irradiation made by the irradiation source while the exposure is modulated according to a desired surface roughness pattern. When the irradiated resist is developed, some areas of the resist are removed as a result of the modulated exposure so that the desired surface roughness pattern is formed in the resist. Through electroforming using the substrate with the resist in which the desired surface roughness pattern is formed, the shape of the surface roughness can be transferred onto a metal substrate, and the metal substrate provided with the desired surface roughness pattern can be obtained. Exposure for the structure for diffusion and the diffraction structure can be carried out at a time. It is also possible that at first exposure for the diffraction structure is carried out, and then exposure for the structure for diffusion is carried out.

In another manufacturing method, a metal substrate for a mold is directly coated with a resist, and the surface of the resist is exposed to irradiation made by the irradiation source while the exposure is modulated according to a desired surface roughness pattern. Finally, etching is carried out so as to transfer the surface roughness pattern in the resist to the metal substrate for the mold. Thus, the desired surface roughness pattern in the metal substrate for the mold can be obtained.

Further, in another manufacturing method, a mold for gratings can be produced with a diamond blade when a diffuser is formed by one-dimensional gratings, circular gratings or elliptic gratings.

Using a mold produced by one of the methods described above, a great number of diffusers can be manufactured through well-known transferring process such as injection molding, stamping, an imprint method or the like. For a material of diffusers, glass can be used besides plastic.

What is claimed is:

1. A diffuser configured by combining
   multiple periodic surface structures having periods that are different from one another, a maximum value of the periods being $\Lambda_{max}$, for making a distribution of intensity of diffused light approximate to a distribution that is uniform at angles equal to or less than a predetermined angle of diffusion θ and is 0 at angles greater than the predetermined angle of diffusion θ, and
   a diffraction structure having a period that is equal to or greater than the $\Lambda_{max}$ and equal to or less than $2\Lambda_{max}$, wherein the multiple periodic surface structures and the diffraction structure are in a certain direction.

2. The diffuser according to claim 1, wherein z-coordinate of the surface of the diffuser is represented by $$z = \sum_{i=1}^{N} \frac{a_i}{2} \cdot f_{\Lambda i}(x) + \frac{h}{2} \cdot f_{\Lambda doe}(x),$$

where an x-axis is defined in the certain direction on a reference plane, a z-axis is defined in the direction perpendicular to the reference plane, each of the multiple periodic surface structures is represented by i, an i-th periodic surface structure is represented by $$f_{\Lambda i}(x),$$

the diffraction structure is represented by $$f_{\Lambda doe}(x),$$

the total number of the multiple periodic surface structures is represented by N, the height of the i-th periodic surface structure is represented by $a_i$, and the height of the diffraction structure is represented by h.

3. The diffuser according to claim 1, wherein the relationship $$\Lambda_d \leq \Lambda_{max} \leq \frac{\lambda}{5n \cdot \sin(2\Delta\theta)}$$

is satisfied for $\Delta\theta$ and $\Lambda_d$ that are determined by $$n \cdot \sin(\Delta\theta) = \frac{\lambda}{\Omega}$$
$$n \cdot \sin\left(\frac{\theta}{2}\right) = \frac{\lambda}{\Lambda_d},$$

where the wavelength of light is represented by λ, the refractive index of a medium through which transmitted light passes is represented by n, and the size of the diffuser is represented by Ω.

4. The diffuser according to claim 1, wherein the relationship $$\tfrac{1}{10}\lambda \leq a \leq 10\lambda$$

is satisfied, where the wavelength of light is represented by λ and the height of a periodic surface structure of the multiple periodic surface structures is represented by a.

5. The diffuser according to claim 1, wherein the relationship $$\frac{\lambda}{5(n_s - 1)} \leq h \leq \frac{\lambda}{n_s - 1}$$

is satisfied, where the wavelength of light is represented by λ, the height of the diffraction structure is represented by h and the refractive index of the material of the diffraction structure is represented by $n_s$.

6. The diffuser according to claim 1, wherein the relationship $$\frac{a_{max}}{\Lambda_{min}} < 1$$

is satisfied, where the maximum value of height of the multiple periodic surface structures is represented by $a_{max}$ and the minimum value of period of the multiple periodic surface structures is represented by $\Lambda_{min}$.

7. The diffuser according to claim 1 wherein the multiple periodic surface structures and the diffraction structure are two-dimensional and z coordinate of the surface of the diffuser is represented by $$z = f_1(x) \cdot f_2(y)$$

where an x-axis and y-axis are defined in two directions orthogonal to each other on a reference plane, a z-axis is defined in the direction perpendicular to the reference plane, z coordinate of the surface of the diffuser in the x-axis direction is represented by $$z = f_2(x)$$

and z coordinate of the surface of the diffuser in the y-axis direction is represented by $$z = f_2(y).$$

8. The diffuser according to claim 1 wherein the multiple periodic surface structures and the diffraction structure are of annular shape, and z coordinate of the surface of the diffuser is represented by $$z = f_3(r)$$

where r represents coordinate in the radial direction of the annular shape on a reference plane, and a z-axis is defined in the direction perpendicular to the reference plane.

9. A method for producing a diffuser comprising the steps of:
forming multiple periodic surface structures having periods that are different from one another, a maximum value of the periods being $\Lambda_{max}$, so as to make a distribution of intensity of diffused light approximate to a distribution that is uniform at angles equal to or less than a predetermined angle of diffusion θ and is 0 at angles greater than the predetermined angle of diffusion θ; and
combining the multiple periodic surface structures with a diffraction structure having a period that is equal to or greater than the $\Lambda_{max}$ and equal to or less than $2\Lambda_{max}$, wherein the multiple periodic surface structures and the diffraction structure are in a certain direction.

10. The method for producing a diffuser according to claim 9 wherein z-coordinate of the surface of the diffuser is represented by $$z = \sum_{i=1}^{N} \frac{a_i}{2} \cdot f_{\Lambda i}(x) + \frac{h}{2} \cdot f_{\Lambda doe}(x),$$

where an x-axis is defined in the certain direction on a reference plane, a z-axis is defined in the direction perpendicular to the reference plane, each of the multiple periodic surface structures is represented by i, an i-th periodic surface structure is represented by $$f_{\Lambda i}(x),$$

the diffraction structure is represented by $$f_{\Lambda doe}(x),$$

the total number of the multiple periodic surface structures is represented by N, the height of the i-th periodic surface structure is represented by $a_i$, and the height of the diffraction structure is represented by h.

11. The method for producing a diffuser according to claim 9 wherein the relationship $$\Lambda_d \le \Lambda_{max} \le \frac{\lambda}{5n \cdot \sin(2\Delta\theta)}$$

is satisfied for $\Delta\theta$ and $\Lambda_d$ that are determined by $$n \cdot \sin(\Delta\theta) = \frac{\lambda}{\Omega}$$

$$n \cdot \sin\left(\frac{\theta}{2}\right) = \frac{\lambda}{\Lambda_d},$$

where the wavelength of light is represented by λ, the refractive index of a medium through which transmitted light passes is represented by n, and the size of the diffuser is represented by Ω.

12. The method for producing a diffuser according to claim 9 wherein the relationship $$1/10 \lambda \le a \le 10\lambda$$

is satisfied, where the wavelength of light is represented by λ and the height of a periodic surface structure of the multiple periodic surface structures is represented by a.

13. The method for producing a diffuser according to claim 9 wherein the relationship $$\frac{\lambda}{5(n_s - 1)} \le h \le \frac{\lambda}{n_s - 1}$$

is satisfied where the wavelength of light is represented by λ, the height of the diffraction structure is represented by h and the refractive index of the material of the diffraction structure is represented by $n_s$.

14. The method for producing a diffuser according to claim 9 wherein the relationship $$\frac{a_{max}}{\Lambda_{min}} < 1$$

is satisfied, where the maximum value of height of the multiple periodic surface structures is represented by $a_{max}$ and the minimum value of period of the multiple periodic surface structures is represented by $\Lambda_{min}$.

* * * * *